Oct. 20, 1931.   W. R. TURNBULL   1,828,303
VARIABLE PITCH PROPELLER
Filed Aug. 14, 1929   2 Sheets-Sheet 1

INVENTOR
Wallace R. Turnbull,
BY
ATTORNEYS

Patented Oct. 20, 1931

1,828,303

UNITED STATES PATENT OFFICE

WALLACE R. TURNBULL, OF ROTHESAY, NEW BRUNSWICK, CANADA

VARIABLE PITCH PROPELLER

Application filed August 14, 1929. Serial No. 385,784.

This invention relates to variable pitch propellers and particularly to propellers of this character embodying an electric motor driven mechanism for adjusting the blade pitch.

One object of the invention is a novel construction and arrangement of an electric motor and propeller drive shaft whereby the motor and its mechanism and particularly the commutating and collecting devices are unaffected by the rotation of the propeller drive shaft.

A further object of the invention is a variable pitch propeller and adjusting mechanism of marked compactness and lightness in weight.

Further objects of the invention will appear from the following specification and the drawings wherein.

Figure 1:
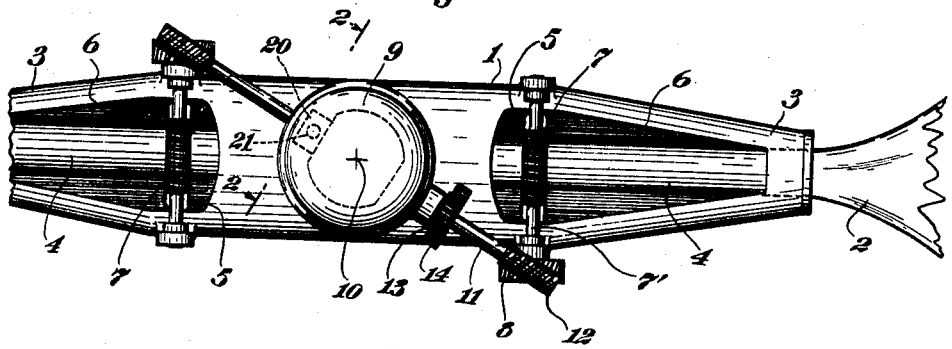
Fig. 1 is a view illustrating one embodiment of the invention.

Referring to Fig. 1 which is a front view of the propeller looking in the direction of the driving axis, I have indicated a propeller including a hub 1, and variable pitch blades 2, the embodiment shown including two such blades, one being omitted for convenience in illustration. The hub 1 is formed with socket parts 3 to receive the shanks 4 of the blades 2, each of the shanks 4 being journaled in the hub both at the outer end of the socket 3 and at the inner end thereof, the journal for the latter being omitted for convenience in illustration. Each shank 4 is provided with a gear segment 5 and the hub 1 is provided with openings 6 through which a pitch altering driving connection is effected. A worm drive 7 suitably mounted on the hub 1 at right angles to the shank meshes with this gear segment 5 and this worm is carried by a shaft 7' which on its projecting end carries the driving gear 8, as for example of the worm type. A driving motor unit 9 is mounted across the axis of rotation 10 of the propeller, the motor 9 being preferably symmetrically arranged about the axis 10 of the propeller and with the motor shaft at right angles to and passing through the axis 10. The two blades 2 are rigidly geared together for simultaneous adjustment in pitch by means of a shaft 11 which is suitably journaled on the hub or electric motor frame structure, this shaft 11 carrying on its ends worms 12 which mesh with the worm pinions 8 on the adjusting cross shafts of the propeller blades. The shaft of motor 9 is geared to the drive shaft 11 through the gears 13 and 14 which are disposed respectively on the motor shaft and the shaft 11. The electric motor 9 is reversible and any suitable connections, such for example as slip rings, may be provided for conducting the current to and from the motor for driving it in either direction desired for varying the pitch of the propeller blades 2. The gear ratio ordinarily is very high as, for example, above 40,000 to 1. A motor unit 9 of comparatively small dimensions and power is sufficient to adjust the angle of the blades 2 and particularly where ball or roller bearings are provided for taking up the thrust due to centrifugal force of the blades as, for example, such as are provided in my application S. N. 209,599 filed July 30, 1927. The provision of a hub structure 1 with the sockets and bearings for the reception of the blade shanks 4 and with the openings 6 for accommodating gearing connections at a point as near as possible to the motor 9 results in a substantial shortening of the gearing shaft and generally in an arrangement characterized by its compactness, its lightness in weight, and its ability to safely withstand the strains to which it is subjected in practice. This construction also renders possible and practicable the use of a one-piece hub 1, the latter being formed of a single hollow casting or forging.

Figure 2:
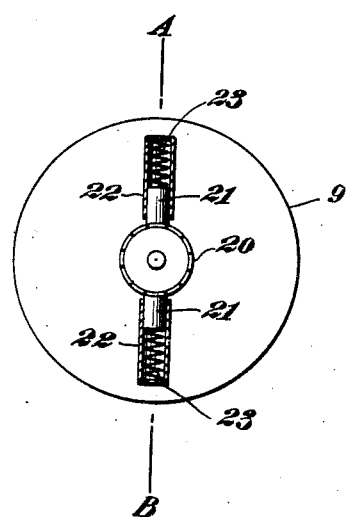
Fig. 2 is a diagrammatic view taken on the line 2—2 of Fig. 1.
Figure 3:
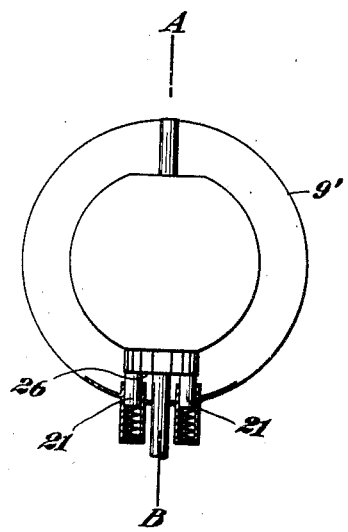
Fig. 3 is a diagrammatic view of the motor and brushes of Fig. 4.

The drive motor 9 is of the type embodying slip current collecting devices such as slip rings or brushes and in the embodiment shown this motor is of the direct current type embodying a commutator 20 and commutator collecting brushes 21, the latter being adjustably retained within supports or casings 22 with springs 23 interposed between the brushes and the casings for constantly urging the brushes against the commutator. The supports 22 may be of the conventional casing type for permitting the brushes to move back and forth under the tension of the springs to accommodate themselves to inaccuracies in the commutator. The motor and its mechanism are symmetrically arranged about the axis A—B of the propeller drive shaft and the collecting devices, such as the brushes 21, are ordinarily removed from this axis, and I have found that where the brushes are disposed at an angle to the axis A—B the variable centrifugal force due to the varying speeds of the propeller cause such a variation in the contact resistance between the brushes and the commutator of the motor as to substantially vary the power of the motor. This in practice renders necessary the provision of a motor of larger capacity than would be required of a motor doing the same work when stationarily mounted and therefore results in undue increase in weight and size of the over-all propeller. I have found that this variation in power of the motor may be obviated by the construction and mounting of the motor upon the propeller in such manner that the neutral or commutation plane of the motor (where the motor shaft is at right angles to the propeller drive shaft axis) includes the axis so that the brushes may be located for movement in this plane and in a direction parallel to the axis A—B. This is the arrangement shown in Figs. 1 and 2. The centrifugal force due to the revolution of the propeller does not affect the tension of the springs 23 and the brushes so that the brush contact resistance is substantially constant at all times and accordingly the power of the motor is unaffected by the whirling of the motor.

Where the electric motor shaft is placed in line with the propeller drive shaft axis A—B, as indicated in Fig. 3, it is desirable that the commutator be in the form of a disc 26, instead of in the form of cylinder as indicated in Fig. 2, with the brushes 21 bearing against this commutator disc or flat surface and disposed in positions parallel to the axis as indicated. As described above in connection with Fig. 1 the rotation of the propeller here does not appreciably affect the contact pressure and electrical resistance between the brushes and the commutator, resulting in the ability to use a motor of minimum capacity and size which is highly desirable in mechanisms of this kind.

It is understood that the propeller unit must receive according to standard propeller practice a final balance by which inequalities of balance are carefully adjusted, as for example by the use of suitable counter weights.

Figure 4:
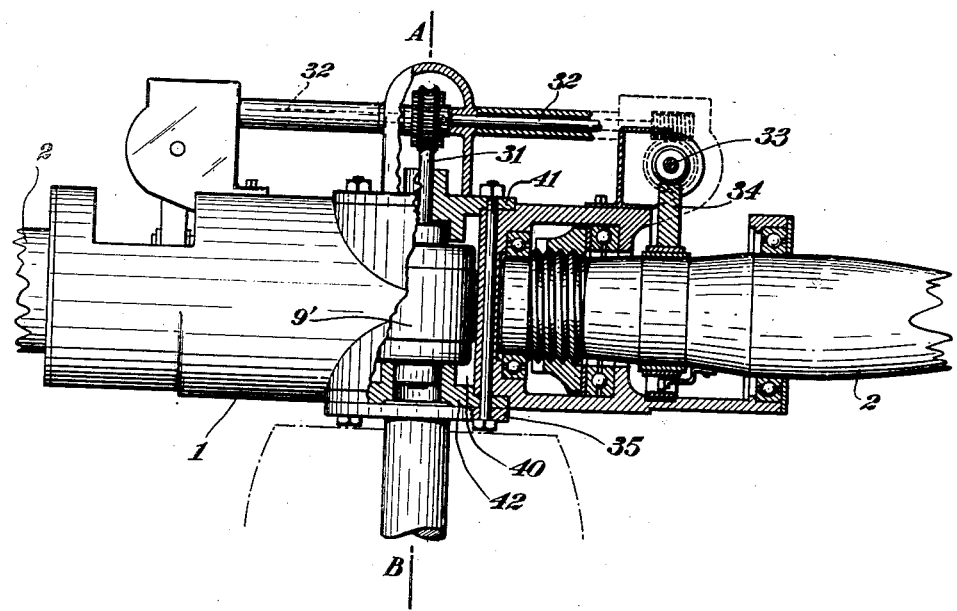
Fig. 4 is a view of a modified form of the invention.

In Fig. 4 I have illustrated a combined variable pitch propeller and electric motor drive mechanism wherein the electric motor is not only symmetrically arranged about the propeller drive shaft axis A—B, but is embodied in the propeller hub. In the particular embodiment shown the electric motor shaft is in line with the propeller drive shaft axis, though the invention is not limited to this relative disposition. The motor may be built as a unit and inserted in a recess 40 in the propeller hub with one end 31 of the motor shaft geared to the blades by the gearing system including the counter shafts 32 which are geared at one end to a worm on the motor shaft and at the other end respectively to the two blades of the propeller through counter shafts 33 and segments 34, a two bladed propeller being shown for convenience in illustration. The motor may be supportetd by plates or brackets 41 and 42 fastened on the sides of the hub, or the hub may be formed with an axial recess just fitting the motor and permitting the insertion of the same from one side of the hub 1, with a retaining plate such as 41 or 42 for retaining the same in position.

Figure 5:
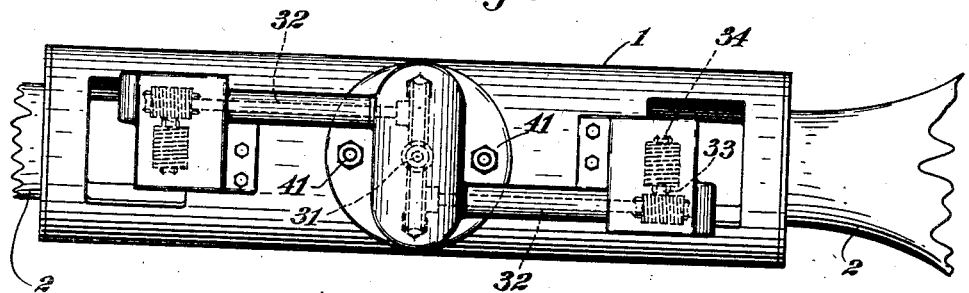
Fig. 5 is a view taken at right angles to Fig. 4.

In the construction shown in Figs. 4 and 5 the propeller unit may be secured to the propeller drive shaft in any suitable manner as for example by means of a flange 35 disposed on the propeller shaft with bolts passing through this flange and through the propeller hub.

Figure 6:
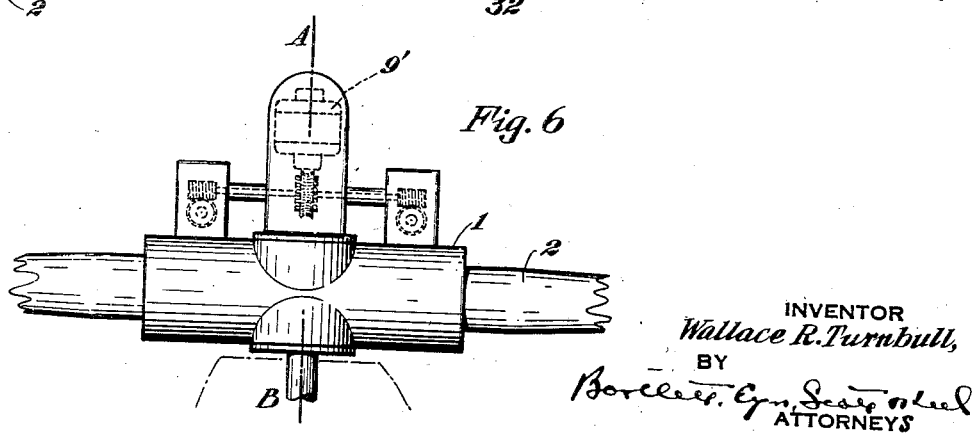
Fig. 6 is a view of a combined propeller and motor varying mechanism embodying certain features of the invention.

In Fig. 6 I have shown a variable pitch propeller with an electric motor drive mechanism wherein the reduction gearing is wholly disposed forward of the plane of rotation of the blades as shown, for example, in Figs. 1 to 5, but in this case the motor is also disposed forward of the plane of rotation of the propeller with its motor shaft in line with the propeller drive shaft axis.

I claim:

1. In a variable pitch propeller unit an electric motor pitch adjusting mechanism including an electric motor which is bodily rotatable with the propeller with the collecting brushes of the electric motor disposed for adjusting movement in a direction substantially parallel to the axis of the propeller drive shaft.

2. In a variable pitch propeller unit an electric motor pitch adjusting mechanism including an electric motor which is bodily rotatable with the propeller, the electric motor shaft being disposed at an angle to the propeller drive shaft axis and the commutation plane of the motor being parallel to or including the axis of the propeller drive shaft.

3. In a variable pitch propeller unit of the character set forth in claim 1 wherein the electric motor shaft includes the axis of the propeller.

4. In a variable pitch propeller unit, an electric motor pitch adjusting mechanism including an electric motor which is bodily rotatable with the propeller, the collecting brushes of the electric motor being contained in chambers disposed substantially parallel to the axis of the propeller drive shaft, whereby the adjusting movement of the brushes is parallel to the axis of the propeller shaft.

In testimony whereof, I have signed my name to this specification.

WALLACE R. TURNBULL.